(12) United States Patent
Williams

(10) Patent No.: US 9,163,615 B2
(45) Date of Patent: Oct. 20, 2015

(54) TUBULAR DEVICE AND ACTUATOR

(75) Inventor: Jeffrey Charles Williams, Cypress, TX (US)

(73) Assignee: Baker Hughes Incorporated, Houston, TX (US)

( * ) Notice: Subject to any disclaimer, the term of this patent is extended or adjusted under 35 U.S.C. 154(b) by 434 days.

(21) Appl. No.: 13/584,342

(22) Filed: Aug. 13, 2012

(65) Prior Publication Data

US 2014/0041377 A1    Feb. 13, 2014

(51) Int. Cl.
*F01B 29/10* (2006.01)
*F03G 7/06* (2006.01)

(52) U.S. Cl.
CPC ........................................ *F03G 7/06* (2013.01)

(58) Field of Classification Search
CPC ........................................................ F03G 7/06
USPC .............................. 60/527–530; 138/121–139
See application file for complete search history.

(56) References Cited

U.S. PATENT DOCUMENTS

| | | | | |
|---|---|---|---|---|
| 3,016,503 A * | 1/1962 | Pierce | ........................... | 333/242 |
| 3,930,419 A * | 1/1976 | Kramer | ........................ | 74/502.5 |
| 4,456,034 A * | 6/1984 | Bixby | ........................... | 138/122 |
| 4,811,761 A * | 3/1989 | Huvey | ........................... | 138/122 |
| 7,971,610 B2 * | 7/2011 | Booth et al. | ................... | 138/131 |
| 8,302,696 B2 * | 11/2012 | Williams et al. | .............. | 166/381 |
| 2011/0240286 A1 * | 10/2011 | Williams et al. | .............. | 166/207 |

OTHER PUBLICATIONS

Hackworth, M., et al. "Development and First Application of Bistable Expandable Sand Screen." SPE 84265. SPE Annual Technical Conference and Exhibition held in Denver, Colorado, U.S.A, Oct. 5-8, 2003. Retrieved online on Jan. 30, 2008 from "http://www.reslink.no/download/00084265.pdf" p. 1-14.

* cited by examiner

*Primary Examiner* — Hoang Nguyen
(74) *Attorney, Agent, or Firm* — Cantor Colburn LLP

(57) ABSTRACT

A tubular device including a tubular having a continuous wall and a substantially constant inner radial dimension and an outer surface that varies in radial dimensions configured to lessen a reduction in a longitudinal dimension of the tubular in response to radial expansion of the tubular in comparison to a reduction in the longitudinal dimension of a constantly-dimensioned-inner-and-outer-radially-surfaced-tubular made of a same material as the tubular.

14 Claims, 3 Drawing Sheets

TUBULAR DEVICE AND ACTUATOR

BACKGROUND

Actuators that are used in connection with tubular systems, such systems being for, for example, carbon dioxide sequestration and hydrocarbon production, employ a variety of motive devices. Electrical motors, solenoids, shape memory alloys and hydraulic systems, are a few of the motive devices successfully employed. Each motive device has specific advantages as well as drawbacks and each finds applications to which they are well suited. A wide variety of ever changing and expanding applications results in operators of tubular systems remaining receptive to new actuators employing new motive devices

BRIEF DESCRIPTION

A tubular device including a tubular having a continuous wall and a substantially constant inner radial dimension and an outer surface that varies in radial dimensions configured to lessen a reduction in a longitudinal dimension of the tubular in response to radial expansion of the tubular in comparison to a reduction in the longitudinal dimension of a constantly-dimensioned-inner-and-outer-radially-surfaced-tubular made of a same material as the tubular.

An actuator including the tubular device and a hollow cylindrical member positioned radially of the tubular device being attached to the tubular device at a first longitudinal location and not attached to the tubular device at a second longitudinal location such that radial expansion of the tubular device causes actuational relative movement between the tubular device and the hollow cylindrical member at the second longitudinal location.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
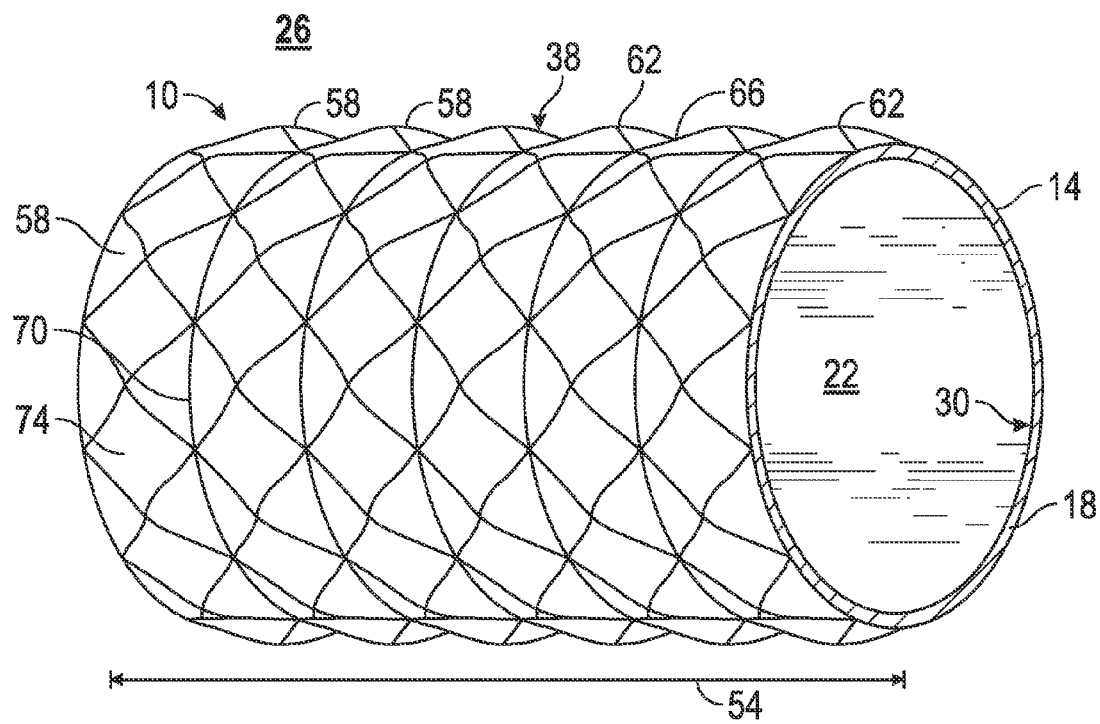
FIG. 1 depicts a perspective view of a tubular device disclosed herein.
Figure 2:
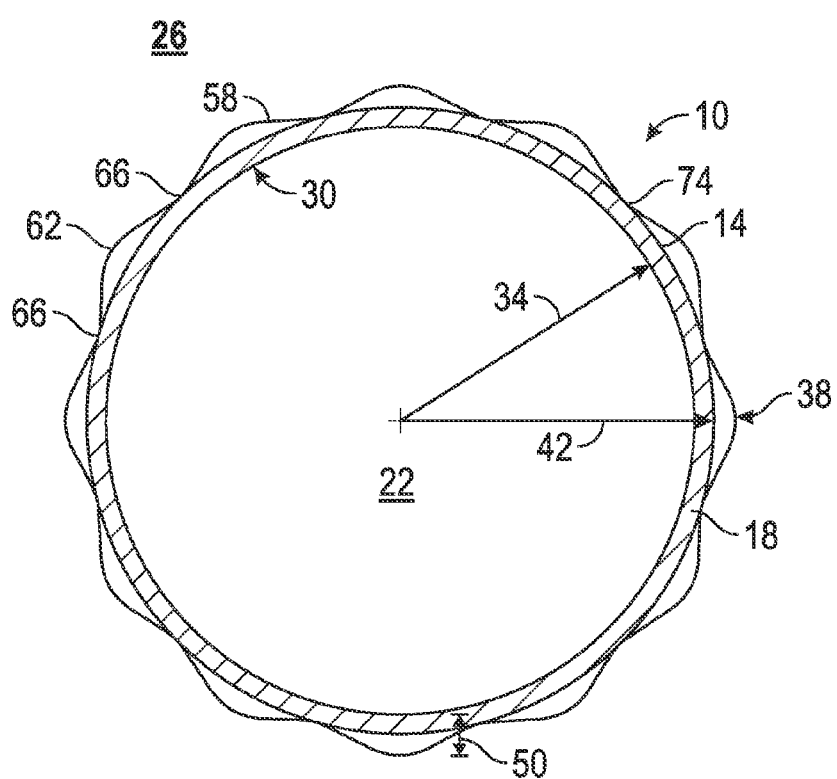
FIG. 2 depicts an cross sectional end view of the tubular device of FIG. 1.
Figure 3:
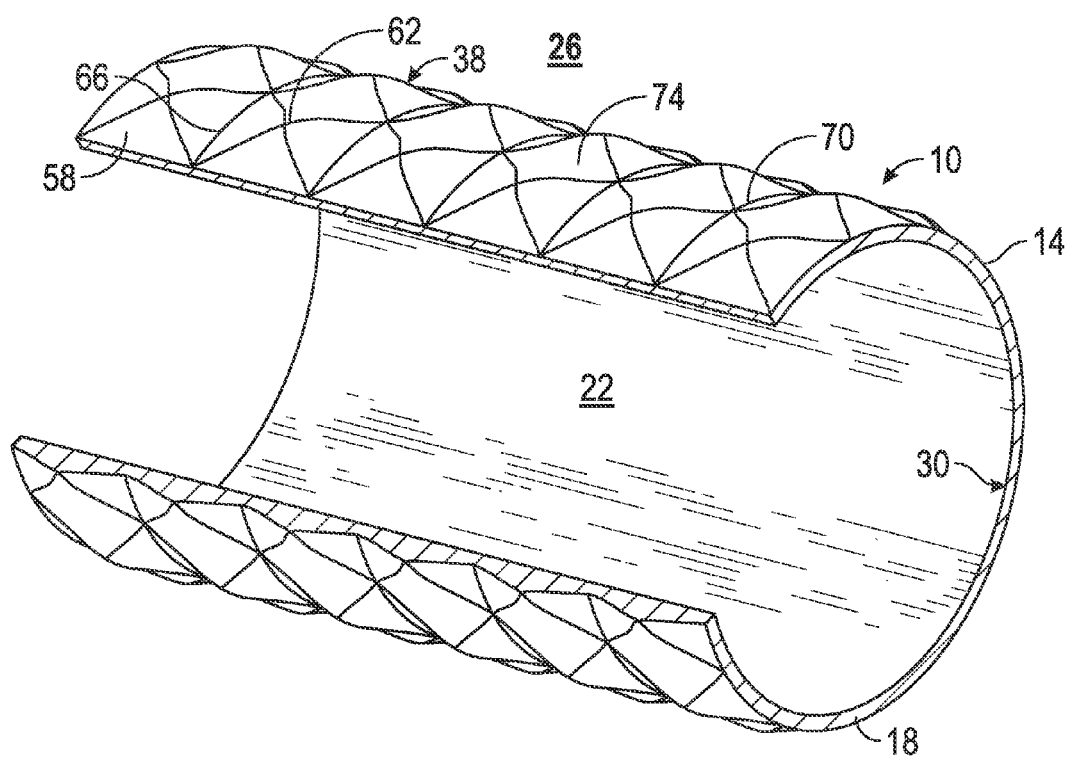
FIG. 3 depicts a perspective view of the tubular device of FIG. 1 with a portion of the tubular removed.

Referring to FIGS. 1-3, a tubular device disclosed herein is illustrated at 10. The tubular device 10 has a tubular 14 with a continuous wall 18 that defines a fluid tight barrier between an inside 22 and an outside 26 of the tubular 14. An inner surface 30 of the tubular 14 has a constant radial dimension 34 (FIG. 2) while an outer surface 38 of the tubular 14 varies in radial dimension 42. As such walls 18 of the tubular 14 vary in thickness 50. The outer surface 38 is configured to cause the tubular 14 to change its longitudinal dimension 54 in response to radial expansion of the tubular 14 a different amount than a hollow cylindrical member (see member 112 of FIG. 4), for example, that is made of a same material as the tubular 14 and has inner and outer radial surfaces with a constant dimension.

The ratio of a change in a first dimension of an object to the change of a second dimension of the object (oriented transverse to the first dimension) that is changed in response to being loaded (either in tension or compression) is called the Poisson's ratio. Typical materials and structures have Poisson's ratios of 0.3 to 0.5. This means that if an object is stretched by 1.0 unit of measure in the first dimension that the object will shrink by 0.3-0.5 units of measure in the transverse dimensions. Similarly, if an object were compressed by 1.0 units of measure in the first dimension the object would grow by 0.3-0.5 units of measure in the transverse dimensions. Embodiments of the tubular device 10 disclosed herein are configured such that the geometry of the tubular 14 causes the tubular 14 to have a Poisson's ratio that is less than a hollow cylindrical member made of a same material as the tubular 14. In fact, the tubular 14 disclosed herein may have a negative Poisson's ratio. In embodiments that have a negative Poisson's ratio the second (transverse) dimension moves in a same direction as the first dimension. In other words, when the first dimension increases the second dimension also increases. Referring again to FIGS. 1-3, for embodiments of the tubular device 10 disclosed herein wherein the Poisson's ratio is negative, the longitudinal dimension 54 increases in response to an increase, or expansion, of the radial dimension 34.

The reduced or negative Poisson's ratio of the tubular 14 is due to the varying radial dimension 50 of the walls 18. This variation is a result of the configuration of the outer surface 38 relative to the inner surface 30. In the embodiment illustrated the outer surface 38 has a plurality of pyramidal-shaped-protrusions 58 defined by peaks 62 and valleys 66, while the inner surface 30 is smooth with constant radial dimension 34. Although the pyramidal-shaped-protrusions 58 in the Figures are positioned in rows 70 and columns 74 along the outer surface 38, alternate embodiments are contemplated. In fact, alternatives to the outer surface 38 are covered by the claims herein as along as the Poisson's ratio of the tubular with the alternate outer surface is less than the Poisson's ratio of a tubular of the same material having constantly dimensioned inner and outer radial surfaces.

Figure 4:
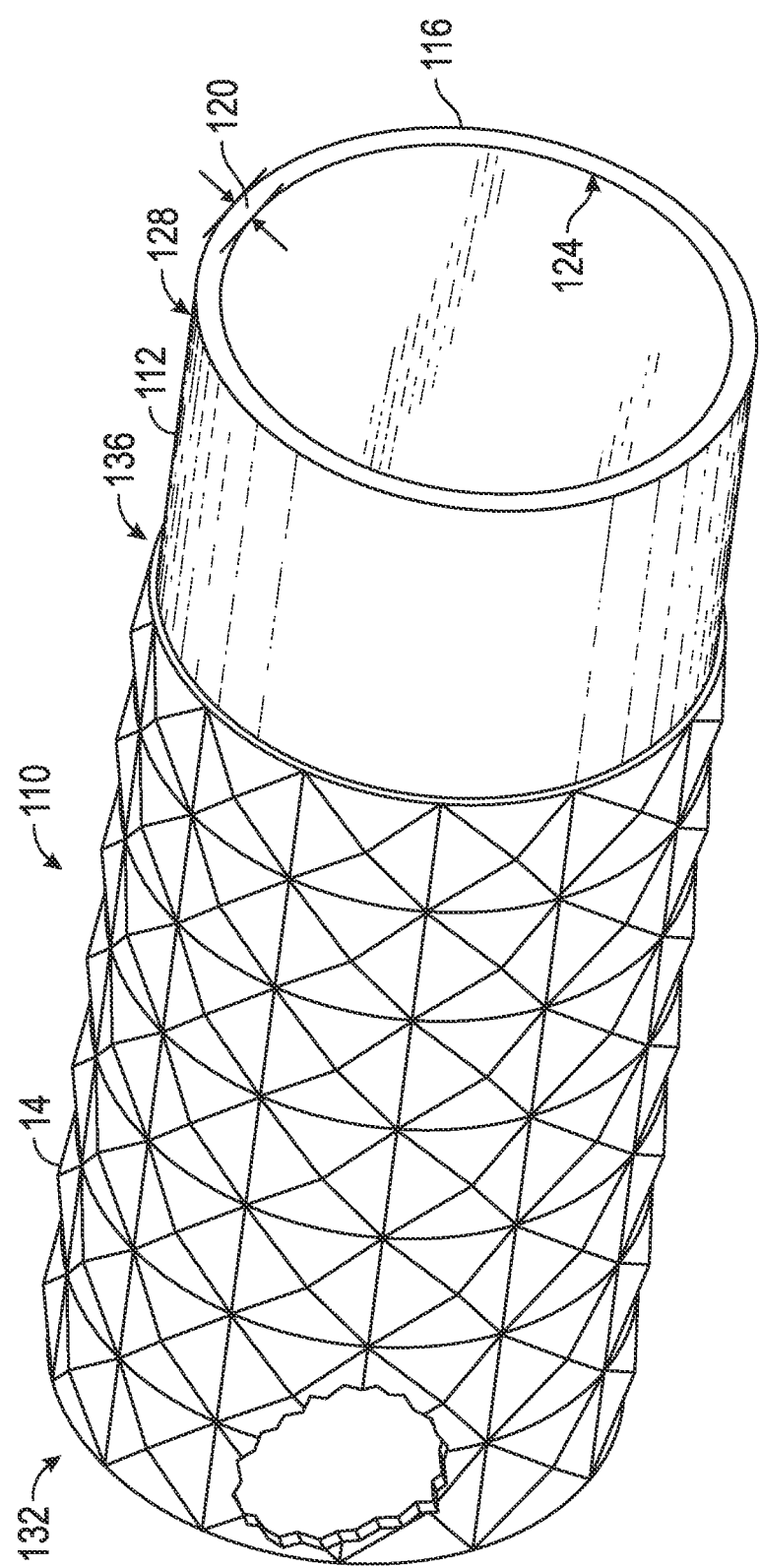
FIG. 4 depicts a perspective view of an actuator employing the tubular device of FIG. 1.

Referring to FIG. 4, an actuator employing the tubular device 10 is illustrated at 110. The actuator 110 includes a hollow cylindrical member 112 illustrated herein as having an inner radial surface 124 and an outer radial surface 128 with constant radial dimensions that is positioned immediately radially inwardly of the tubular 14. The hollow cylindrical member 112 has walls 116 of substantially constant thickness 120. As such, expanding the hollow cylindrical member 112 radially outwardly will cause a similar radial outward expansion of the tubular 14. The hollow cylindrical member 112 and the tubular 14 of the embodiment shown are made of the same material, which can be metal, polymeric or other. Since, as described above, the tubular 14 as disclosed has less longitudinal contraction as a result of radial expansion than does the hollow cylindrical member 112 as both are radially expanded the hollow cylindrical member 112 will longitudinally contract or shrink a greater amount than does the tubular 14. Since the tubular 14 and the hollow cylindrical member 112 are fixedly attached to one another at a first longitudinal location 132 and are not attached to one another at a second longitudinal location 136 there will be relative longitudinal movement between the tubular 14 and the hollow cylindrical member 112 at the second longitudinal location 136. By attaching the tubular 14 and the hollow cylindrical member 112 to movable portions of a tool (not shown) this differential longitudinal movement can be used to actuate the tool attached thereto.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed:

1. A tubular device comprising a tubular having a continuous wall and a substantially constant inner radial dimension over a longitudinal portion of the tubular and an outer surface that varies in radial dimensions over the longitudinal portion, the longitudinal portion being configured such that a rate of reduction in a longitudinal dimension of the longitudinal portion in response to radial expansion of the longitudinal portion is less than a rate of reduction of a longitudinal dimension of a constantly-dimensioned-inner-and-outer-radially-surfaced-tubular made of a same material as the tubular.

2. The tubular device of claim 1, wherein the rate of reduction in the longitudinal dimension of the longitudinal portion is actually a growth in the longitudinal dimension of the longitudinal portion.

3. The tubular device of claim 1, wherein the longitudinal portion has a negative Poisson's ratio.

4. The tubular device of claim 1, wherein the continuous wall of the longitudinal portion defines a fluid tight barrier.

5. The tubular device of claim 1, wherein the outer surface includes pyramidal-shaped-protrusions.

6. The tubular device of claim 5, wherein the pyramidal-shaped-protrusions are oriented in at least one of rows and columns on the outer surface.

7. The tubular device of claim 1, wherein the continuous wall varies in thickness due to the outer surface varying in radial dimensions.

8. The tubular device of claim 1, wherein the constant inner radial dimension defines an inner surface that is smooth.

9. An actuator, comprising:
the tubular device of claim 1; and
a hollow cylindrical member positioned radially of the tubular device being attached to the tubular device at a first longitudinal location and not attached to the tubular device at a second longitudinal location such that radial expansion of the actuator causes actuational relative movement between the tubular device and the hollow cylindrical member at the second longitudinal location.

10. The actuator of claim 9 wherein the hollow cylindrical member has a tubular shape.

11. The actuator of claim 10 wherein the hollow cylindrical member has a positive Poisson's ratio that is different than a Poisson's ratio of the longitudinal portion.

12. The actuator of claim 9 wherein a Poisson's ratio of the longitudinal portion is negative and a Poisson's ratio of the hollow cylindrical member is positive.

13. The actuator of claim 9 wherein the hollow cylindrical member has walls of substantially constant thickness.

14. The actuator of claim 9 wherein the hollow cylindrical member is made of the same material as the tubular.

* * * * *